United States Patent

Watanabe et al.

[11] Patent Number: 5,595,089
[45] Date of Patent: Jan. 21, 1997

[54] ACTUATOR FOR STEERING REAR WHEELS

[75] Inventors: Tsukasa Watanabe, Toyota; Mutsumi Miyashiro, Nishikamo-gun; Shuuetsu Suzuki, Anjou; Takeshi Goto, Toyota; Kozo Fujita, Nishikamo-gun, all of Japan

[73] Assignees: Aisin Seiki Kabushiki Kaisha, Kariya; Toyota Jidosha Kabushiki Kaisha, Toyota, both of Japan

[21] Appl. No.: 379,966

[22] Filed: Jan. 27, 1995

[30] Foreign Application Priority Data

Jan. 31, 1994 [JP] Japan ............................ 6-009554

[51] Int. Cl.[6] ............................................. B62D 6/00
[52] U.S. Cl. .................... 74/89.15; 180/315; 475/149; 475/331
[58] Field of Search .................... 74/89.15; 475/149, 475/330, 331, 337; 180/140, 79.1

[56] References Cited

U.S. PATENT DOCUMENTS

| | | | |
|---|---|---|---|
| 2,591,967 | 4/1952 | Ridgely et al. | 475/337 |
| 4,183,266 | 1/1980 | Osumi | 475/337 |
| 4,766,970 | 8/1988 | Shimizu | 180/79.1 |
| 4,773,497 | 9/1988 | Carlson et al. | 180/79.1 |
| 4,903,535 | 2/1990 | Kikuta et al. | 74/89.15 |
| 4,936,401 | 6/1990 | Baraszu et al. | 180/79.1 |
| 4,987,788 | 1/1991 | Bausch | 74/89.15 |
| 5,083,626 | 1/1992 | Abe et al. | 180/79.1 |
| 5,086,861 | 2/1992 | Peterson | 180/79.1 |
| 5,097,917 | 3/1992 | Serizawa et al. | 180/79.1 |
| 5,135,067 | 8/1992 | Kohata et al. | 180/79.1 |
| 5,251,135 | 10/1993 | Serizawa et al. | 180/79.1 X |
| 5,299,649 | 4/1994 | Sano et al. | 180/79.1 |
| 5,402,341 | 3/1995 | Liubakka et al. | 180/79.1 X |
| 5,472,060 | 12/1995 | Sano et al. | 180/79.1 |

FOREIGN PATENT DOCUMENTS

| | | |
|---|---|---|
| 60-154955 | 8/1985 | Japan . |
| 60-206782 | 10/1985 | Japan . |
| 63-103763 | 5/1988 | Japan . |
| 4502591 | 5/1992 | Japan . |
| 5330446 | 12/1993 | Japan . |
| 5330445 | 12/1993 | Japan . |

*Primary Examiner*—Vinh T. Luong
*Assistant Examiner*—Troy Grabow
*Attorney, Agent, or Firm*—Sughrue, Mion, Zinn, Macpeak & Seas

[57] ABSTRACT

An actuator for steering rear wheels is reduced in size and its construction is simplified while preventing a degradation in the reliability. An electric coil 2 is disposed on the outside while a rotor is disposed on the inside, assisting in heating dissipation. One of bearings 10 which support a rotor and an electric coil 2 are integrally secured to a casing 1 when a resin 3 is molded thereon. At the same time, a ring gear 12 is formed by the molding of the resin 3. In addition, the molding operation of the resin forms one of sun gears, 11a, integrally with a rotor 4. The casing 1 is formed with a recess or projection 1a, 1b, thus preventing a slip of the resin member 3 from occurring. A permanent magnet 13 which is separate from a permanent magnet 5 used for driving is mounted on the rotor.

10 Claims, 8 Drawing Sheets

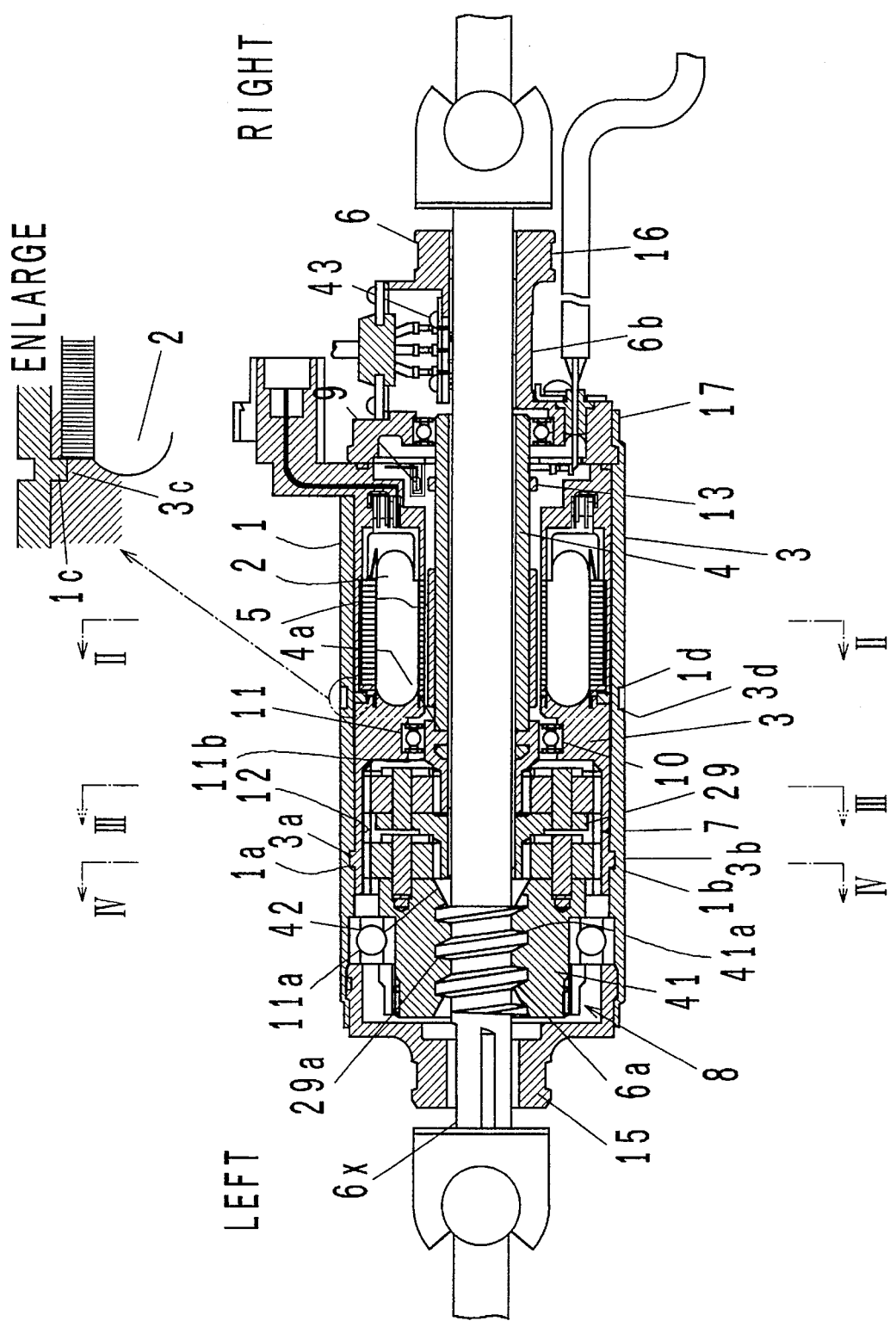

ACTUATOR FOR STEERING REAR WHEELS

BACKGROUND OF THE INVENTION

The invention relates to an actuator for steering rear wheels which may find its application in axially driving a steering shaft, by connection therewith, in order to assist a steering of an automobile, for example.

To realize a four wheel steering system for an automobile, for example, there is a need to provide an actuator for steering rear wheels which is operative to drive a steering shaft for the rear wheels in the axial direction thereof. To realize a high precision in controlling the steer angle, it is desirable to use such actuator which can be electrically driven.

Accordingly, an actuator for steering rear wheels of the kind described conventionally comprises an electric motor, a reduction gearing connected to the output from the motor, and a converter mechanism which transmits a rotary motion, outputted from the reduction gearing, to a steering shaft as converted into a linear motion.

Such actuators are known in the art, as disclosed in Japanese Laid-Open Patent Applications No. 154,955/1985, No. 206,782/1985, No. 103,763/1988, No. 330,445/1993, and No. 330,446/1993 and Patent Publication No. 502,591/1992 (International Laid-Open No.: WO90/03,910).

An actuator for driving rear wheels, which is available in the art, is bulky in size and complex in construction, requiring time and labor for assembly during the manufacturing and thus resulting in a high manufacturing cost. However, it is very difficult to reduce the size of such actuator. By way of example, while a reduction in the size of the electric motor is indispensable in order to reduce the size of such actuator, the heating effect which occurs when the motor is driving is likely to cause a failure by a temperature rise inasmuch as a motor having a reduced size must be housed in an enclosed space of limited volume.

SUMMARY OF THE INVENTION

It is a task of the invention to reduce the size of an actuator for steering rear wheels, to simplify the construction thereof and to prevent a degradation in the reliability.

Such task is met by an actuator for steering rear wheels constructed in accordance with the invention, comprising a housing member (1) which is cylindrically shaped, a cylindrical coil member (2) which is coaxially disposed within the internal space of the housing member, a support member (3) molded from resin integrally with the housing member and the coil member around the inner wall of the housing member for supporting the coil member in an integral manner with the housing member, a cylindrical rotor member (4) disposed in a space located inside the coil member and in a coaxial relationship with the housing member and rotatably supported by the support member through a bearing, a permanent magnet member (5) mounted on the rotor member, a drive shaft member (6) disposed so as to extend through a central space within the rotor member, an epicyclic gearing (7) disposed in an internal space of the housing member in coaxial relationship therewith and including a first sun gear which is connected to the rotor member, a motion conversion mechanism (8) disposed in an internal space of the housing member in coaxial relationship therewith so as to be interposed between the epicyclic gearing and the drive shaft member for converting a rotary motion from the former into a linear motion in the axial direction of the latter, and magnetic pole detecting means (9) disposed in the internal space of the housing member for detecting the position of a magnetic pole on the permanent magnet member.

In a preferred embodiment of the invention, when the support member is molded, one of bearings (10) which support the rotor member is disposed inside a mold so that the bearing is integrally secured to the support member.

In another preferred embodiment of the invention, when the support member (3) is molded, a ring gear (12) of the epicyclic gearing (7) may be formed around the part of the inner peripheral wall of the support member in accordance with the configuration of the mold used.

In a further preferred embodiment of the invention, the housing member is formed with a recess (1a, 1b) or a projection in a region where it abuts against the support member before the support member (3) is molded upon the housing member (1).

It is to be understood that numerals and characters appearing in parentheses in the above description denote reference numerals and characters which are used to designate corresponding parts used in an embodiment to be described later, but it should be understood that the components which are essential to construct the invention are not limited to specific elements shown in the embodiments.

In accordance with the invention, a cylindrical coil member (2) is integrally secured, by a support member (3), formed of resin, in an internal space of a cylindrical housing member (1), and defines a stator of an electric motor. A cylindrical rotor member (4) is disposed inside the coil member, and is rotatably supported by the support member through a bearing. A permanent magnet member (5) is mounted on the rotor member at a location where it opposes the coil member, so that when the coil member is energized, a rotating force is exerted upon the rotor member, which therefore functions as a rotor of the electric motor. The rotating force from the rotor member is transmitted through an epicyclic gearing (7) including a sun gear which is connected therewith to a motion conversion mechanism (8), which converts the rotary motion into an axially linear motion, which is in turn transmitted to a drive shaft member (6). Magnetic pole detecting means (9) detects the location of a magnetic pole on the permanent magnet member, and accordingly, by switching the energization of the coil member on the basis of position data detected, the rotor member may be continuously and rotatively driven.

With this construction, a drive source (2, 4, 5), a reduction gearing (7), a conversion mechanism (8) and an output shaft (6) can all be disposed on a common shaft, dispensing with the provision of a separate member in order to provide a connection therebetween and allowing certain components to be shared, thus simplifying the construction and enabling a reduction in the size. In particular, since the coil member, which is a source of heat generated, is located outside the rotor, the heat from the coil member can be easily dissipated to the exterior through the housing member located adjacent thereto, thus preventing a significant temperature rise without requiring any additional space which is specially designed for heat dissipation. In this manner, the entire actuator can be reduced in size. Finally, because the rotor can be formed in a small diameter, hence the inertia thereof is reduced, thus improving the response of the actuator.

Preferably one of bearings (10) which support the rotor member (4) is disposed inside a mold so as to be integrally secured to the support member when the support member (3)

is molded. This again dispenses with an addition of a special member or a boring operation or like machining in order to fix the bearing in position, thus contributing to simplifying the construction and facilitating the assembly.

Also when the support member (3) is molded, a ring gear (12) of the epicyclic gearing (7) is preferably formed around a part of the internal peripheral wall of the support member in accordance with the configuration of the mold, thus eliminating the need for a ring gear as a separate part, thus reducing the number of parts and simplifying the assembly.

In addition, when the support member (3) is molded upon the housing member (1), the housing member is preferably formed with a recess (1a, 1b) or a projection in a region where it abuts against the support member. The molding operation produces a mating projection or mating recess on or in the support member, thus enabling a positive form-mating engagement therebetween. It will be seen that in the construction of the invention, the housing member is cylindrical as is the outer peripheral surface of the support member which abuts against it, so that a slip is likely to occur in the rotational direction between the support member and the housing member depending on the rotating drive applied between the coil member and the rotor member. However, the form-mating engagement between the recess and the projection of the support member and the housing member prevents such slip from occurring.

BRIEF DESCRIPTION OF THE DRAWINGS

FIG. 11 is an enlarged longitudinal section of a region designated XI in FIG. 1.

DETAILED DESCRIPTION OF PREFERRED EMBODIMENT

Figure 2:
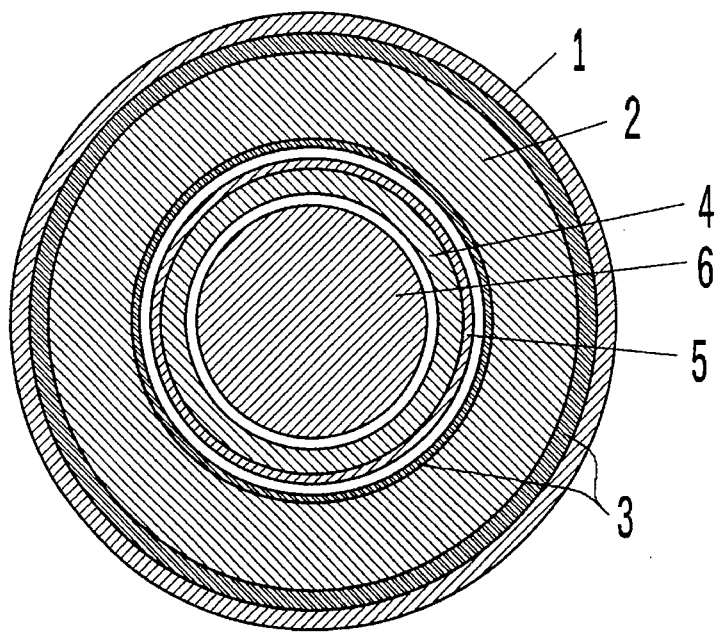
FIG. 2 is a transverse section taken along the line II—II shown in FIG. 1.
Figure 3:
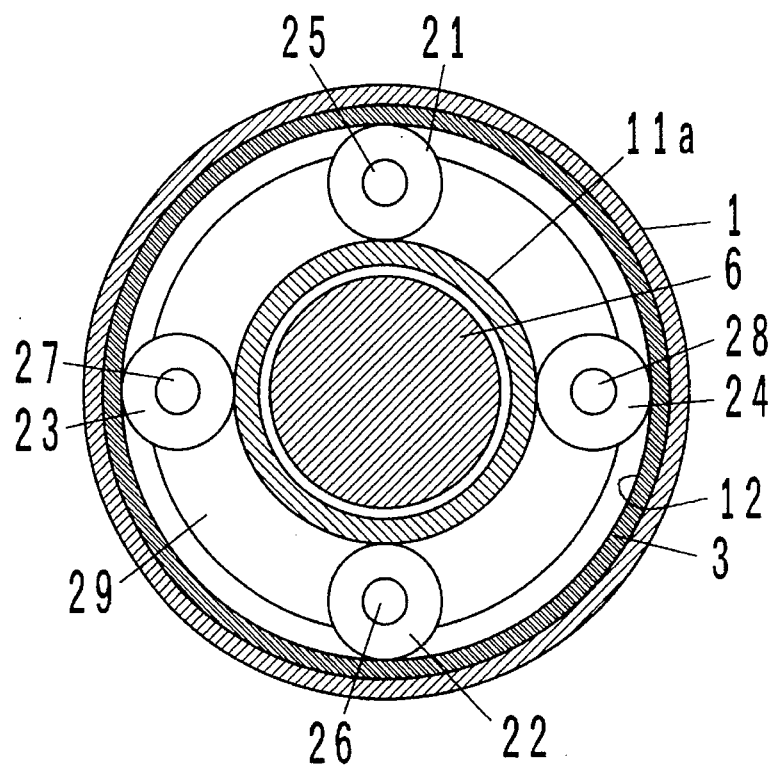
FIG. 3 is a transverse section taken along the line III—III shown in FIG. 1.
Figure 4:
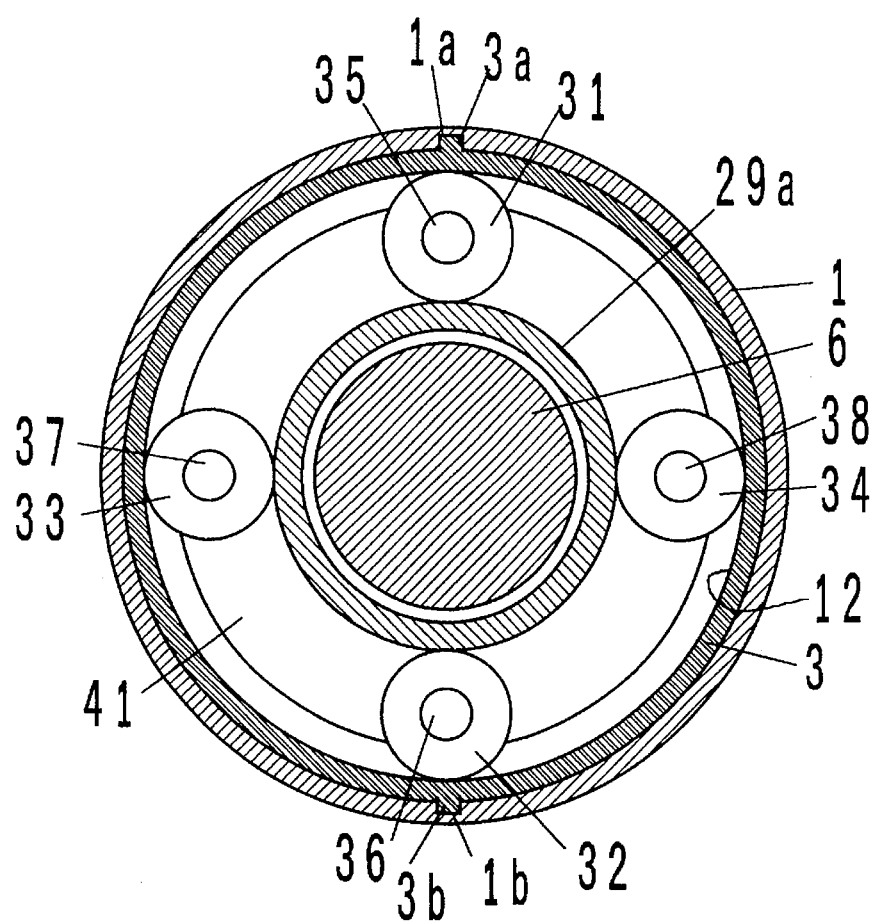
FIG. 4 is a transverse section taken along the line IV—IV shown in FIG. 1.
Figure 1:
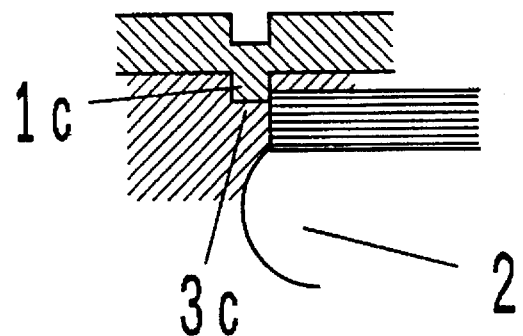
FIG 1 is a longitudinal section of an actuator for steering rear wheels according to one embodiment of the invention.

An actuator for steering rear wheels according to one embodiment of the invention is shown in longitudinal section in FIG. 1, and its transverse sections taken along the lines II—II, III—III and IV—IV shown in FIG. 1 are indicated in FIGS. 2, 3 and 4, respectively. Initially referring to FIG. 1, the actuator includes a casing 1, which is cylindrical and is formed of iron. To reduce the cost involved, the casing 1 is shaped by forming an iron pipe. Any other material which exhibits an excellent heat dissipating capability and which lends itself to a machining operation can be used other than an iron pipe. A pair of bearing members 15 and 16, formed of aluminium, are mounted in the casing 1 at the opposite ends thereof. An actuator shaft 6 extends through the casing 1 and is supported by the bearings 15, 16 so as to be axially movable. The actuator shaft 6 is formed with a groove 6x, which is engaged by a projection, not shown, which projects from the bearing member 15 to prevent a movement of the actuator shaft 6 in the angular direction.

In general use, steering members for a rear left and a rear right wheel of an automobile are connected to the opposite left and right ends of the actuator shaft 6, which is displaced axially to implement a steering of the rear wheels.

A drive source four the actuator shaft 6 comprises an electric motor, which is internally housed within and integral with the actuator. The electric motor used in the present embodiment differs from a usual electric motor in that an electric coil 2 is disposed in the stator while a permanent magnet 5 is disposed on a rotor which is disposed inside the stator. The coil 2 comprises a three phase arrangement. The coil 2 generates a given moving magnetic field depending on the position of a magnetic pole on the permanent magnet 5, thereby rotatively driving the rotor which is integral with the permanent magnet 5.

The electric coil 2 comprises a cylindrical subassembly having an outer diameter which is slightly less than the internal diameter of the casing 1, and is disposed inside the casing 1. After the coil 2 is placed inside the casing 1, a resin material 3 is molded integrally with the casing 1 and the coil 2. An anti-rotation lock for the resin material 3 is provided by projections 1c, 1d which are driven from the outside of the casing 1 and recesses 1a, 1b which are driven into the inside of the casing 1. After the coil 2 is positioned by the projections 1c, 1d in a left-and-right direction, as viewed in the drawings, the molding operation takes place. It will be seen that the coil 2 and the casing 1 are located close to each other with a thin layer of resin (3) interposed therebetween. This enables heat generated by the coil 2 to be easily transferred to the casing 1.

Figure 5:
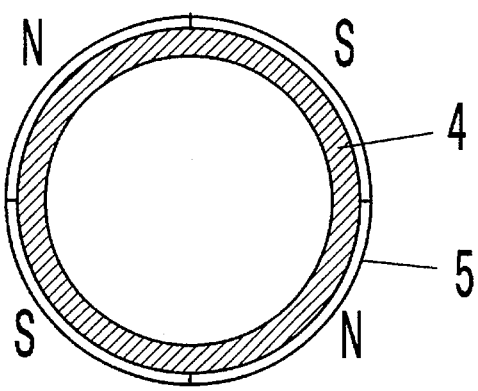
FIG. 5 is a fragmentary section illustrating a part of FIG. 2.

On the other hand, a rotor of the electric motor comprises a cylindrical rotor member 4 formed of iron, a cylindrical permanent magnet 5 mounted around the outer periphery of the rotor member 4, and a power transmitting member 11. The opposite ends of the rotor are rotatably supported by bearings 10 and 17. The permanent magnet 5 comprises neodymium, a rare earth element, and is circumferentially formed with four magnetic poles as shown in FIG. 5. The permanent magnet 5 has an outer diameter which is slightly less than the internal diameter of the coil subassembly, and the inner diameter of the rotor member 4 is slightly greater than the outer diameter of the actuator shaft 6. The outer periphery of the bearing 10 is integrally secured to the casing 1 by means of the resin material 3 while the outer periphery of the bearing 17 is supported by a bearing member 16. Accordingly, the rotor is rotatable in an annular space disposed between the subassembly of the electric coil 2 and the actuator shaft 6, as indicated in FIG. 2.

The power transmitting member 11 is formed into a substantially cylindrical configuration by resin, and is disposed coaxially with the rotor member 4 and is integrally secured to one end thereof. At its one end, the power transmitting member 11 is formed with a gear 11a around its outer periphery or a portion thereof which extends outwardly of the rotor member 4. The gear 11a defines a first sun gear of an epicyclic gearing 7. Accordingly, when the motor is driven, the gear 11a of the power transmitting member 11 rotates to transmit the drive to the epicyclic gearing 7.

The epicyclic gearing 7 comprises a pair of planetary gear trains connected in tandem. A first train comprises a sun gear 11a, planet gears 21, 22, 23 and 24, and a ring gear 12, as shown in FIG. 3. A second planetary gear train comprises a sun gear 29a, planet gears 31, 32, 33 and 34, and the ring gear 12, as shown in FIG. 4. The ring gear 12 is used in common between the pair of planetary gear trains, and is simultaneously molded as the resin member 3 is molded integrally with the casing 1.

The planet gears 21, 22, 23 and 24 in the first train are rotatably mounted on individual shafts 25, 26, 27 and 28, respectively, which are fixedly mounted on a doughnut-shaped connecting plate 29, and the sun gear 29a in the second train is formed around a cylindrical projection located centrally on the connecting plate 29. The planet gears 31, 32, 33 and 34 in the second train are rotatably mounted on individual shafts 35, 36, 37 and 38, respectively, which are secured to a nut 41.

Accordingly, when the rotor member 4 rotates, the sun gear 11a which is integral therewith rotates, whereby the planet gears 21, 22, 23 and 24 in the first train revolve around the sun gear 11a to cause a rotation of the associated shafts 25 to 28 as well as its coupled connecting plate 29, whereby the sun gear 29a in the second train formed on the connecting plate 29 rotates to cause a revolution of the planet gears 31, 32, 33 and 34 in the second train around the sun gear 29a, causing a corresponding rotation of their associated shafts 35 to 38 and its coupled nut 41.

Figure 10:
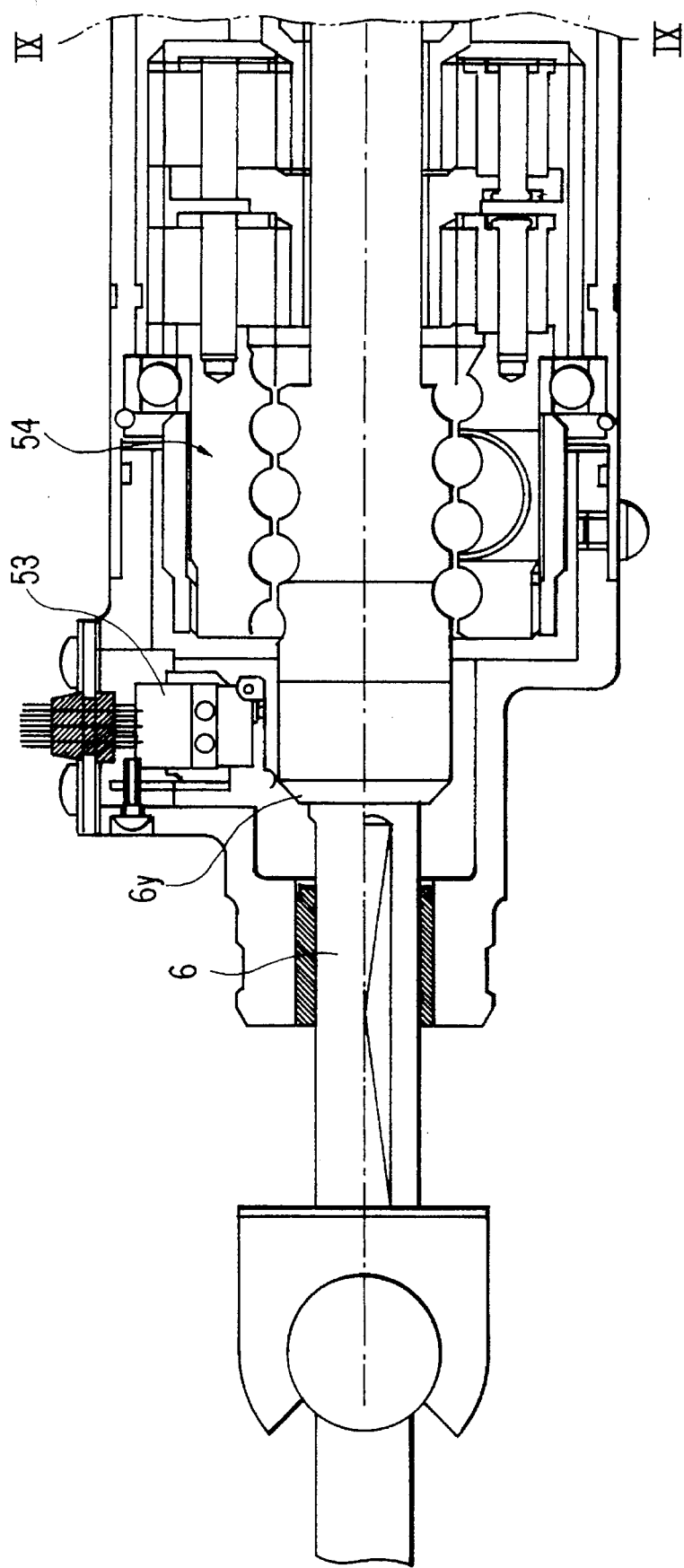
FIG. 10 is a longitudinal section of remaining portion of FIG. 9.

The nut 41 is rotatably supported within the casing 1 by a bearing 42, but is immovable in the axial direction. The nut 41 is formed with trapezoidal threads 41a, which mesh with a mating trapezoidal screw 6a formed on the actuator shaft 6. Accordingly, as the nut 41 rotates, the trapezoidal screw 6a which is in meshing engagement with the trapezoidal threads 41a is displaced axially to cause an axial displacement of the actuator shaft 6. In other words, the combination of the nut 41 and the trapezoidal threads 6a defines a conversion mechanism 8 which converts a rotary motion of the epicyclic gearing 7 into a linear motion of the actuator shaft 6. It is to be noted that the conversion mechanism may comprise a ball screw, in a modification as illustrated in FIG. 10.

At a location spaced from the permanent magnet 5, the rotor member 4 also carries another smaller permanent magnet 13 having magnetic poles formed thereon which are disposed in the same arrangement (see FIG. 5) as the magnetic poles on the permanent magnet 5. A Hall element 9 is disposed adjacent to the permanent magnet 13. Specifically, the Hall element 9 is fixedly mounted on the bearing member 16 which is integral with the casing 1. Accordingly, as the rotor member 4 rotates as does the magnetic poles of the permanent magnet 13, the Hall element 9 emits a pulse signal. The position of a magnetic pole on the rotor of the electric motor can be determined by referring to the pulse signal which is outputted from the Hall element 9.

A potentiometer 43 is mounted on the bearing member 16, and includes a slider which engages a stub shaft 6b on the actuator shaft 6. In this manner, the potentiometer 43 detects an axial position of the actuator shaft 6 or the position to which the actuator is driven.

A process of manufacturing the actuator of the above embodiment will now be described. The electric coil 2 is disposed on a given winding form to define a subassembly of the coil 2. In the present example, the coil 2 is formed as an elliptical winding, as viewed in the cross section of FIG. 1.

The subassembly is mounted on a mold A, not shown, and the bearing 10 is mounted on another mold B, not shown. The mold A is inserted into the cylindrical casing 1 from the right end thereof, as viewed in FIG. 1, while the mold B is inserted into the casing 1 from the left end thereof, and the coil 2 subassembly and the bearing 10 are positioned as indicated in FIG. 1.

A molding resin is cast into a space or clearance defined or left by the casing 1, the mold A and the mold B, thus filling the clearance with the resin. When the resin is set, the mold A and the mold B are removed from the casing 1.

As a result, the resin material 3 is molded into a hardened piece, and at the same time the coil assembly 2 and the bearing 10 are secured within the casing 1 by means of the resin material 3. The mold B has an outer diameter which is slightly less than the inner diameter of the casing 1, and is formed with teeth around part of its periphery, whereby the ring gear 12 is molded around the inner wall (partly) of the resin member 3.

As Shown in FIGS. 1 and 4, the inner wall of the casing 1 is previously formed with the recesses 1a and 1b, into which the resin finds its way to form projections 3a and 3b in a manner corresponding to the recesses 1a and 1b around the outer periphery of the resin member 3. In this manner, a positive engagement between the recesses 1a, 1b and the projections 3a, 3b is achieved. Because the casing 1 is cylindrical in configuration, a simple molding of the resin member 3 will result in causing a slip between the resin member 3 and the casing 1, but the engagement between the recesses 1a, 1b and the projections 3a, 3b reliably prevents a relative movement or relative rotation therebetween.

In a similar as shown in FIGS. 1 and 11, since the inner wall of the casing 1 is previously formed with projections 1c, 1d, the resin defines recesses 3c, 3d around the outer periphery of the resin member 3 which correspond to the projections 1c and 1d. Again, a positive engagement between the projections 1c, 1d and the recesses 3c, 3d is achieved, reliably preventing a relative movement or relative rotation therebetween.

It will be noted that the recesses 1a, 1b may be replaced by openings or holes, and alternatively that the casing 1 may be previously formed with projections.

When producing a rotor subassembly, molds C and D, both not shown, are mounted on the rotor member 4, and a molding resin is injected into a clearance left therebetween (namely, a space corresponding to the power transmitting member 11). When the resin is set, the power transmitting member 11 is formed. During the molding operation, a gear (sun gear) 11a is formed around the outer periphery of the power transmitting member 11 at a location which extends out of the rotor member. The tip of the rotor member 4 is formed with an opening 4a, and accordingly, as a result of the molding operation, the power transmitting member 11 is formed with a projection 11b, which then engages the opening 4a in the rotor member 4 to provide a positive connection between the power transmitting member 11 and the rotor member 4. Subsequently, the cylindrical permanent magnet 5 and the annular permanent magnet 13 are fixedly mounted upon the rotor member 4.

Subsequently, the nut 41 is mounted on the actuator shaft 6, the shafts 35, 36, 37 and 38 are mounted on the nut 41, and the planet gears 31, 32, 33 and 34 are mounted on the shafts 35, 36, 37 and 38, respectively. Additionally, the connecting plate 29 is mounted on the actuator shaft 6, the shafts 25, 26, 27 and 28 are mounted on the connecting plate 29, and the planet gears 21, 22, 23 and 24 are mounted on the shafts 25, 26, 27 and 28, respectively. After the rotor subassembly is mounted on the actuator shaft 6, the actuator shaft 6 together with its integral parts are inserted into the molded casing 1 from its left end toward the right. The bearing 42 is then inserted into the casing 1 from the left end thereof, and the bearing member 15 is mounted. An integral subassembly comprising the Hall element 9, the bearing 17, the potentiometer 43 and the bearing member 16 is inserted into the casing 1 from the right end thereof, and then secured in place within the casing 1.

It should be understood that the described procedure of assembling parts is exemplary only, and may be modified as desired. An iron pipe which is commercially available and is inexpensive is utilized to form the casing 1, by machining the opposite sides of the iron pipe to provide required projections and recesses, thereby providing a very inexpensive casing. Since the ring gear is formed simultaneously as the coil 2 is molded with the casing 1, there is no need to provide or form a ring gear separately, thus reducing the manufacturing cost.

It will be noted that since the coil 2 is disposed on one side of the casing 1 and since the casing 1 comprises an iron pipe and is separated from the coil 2 by a thin resin layer, an excellent heat dissipating capability is achieved even though the actuator itself is small in size. In addition, because the coil 2 does not rotate in operation, the inertia is reduced, allowing an increased output to be obtained for its size.

When the trapezoidal screw is used in the conversion mechanism as in the described embodiment, the rotor does not rotate if the wheels are subject to forces applied from the road surface, thus achieving a null reverse efficiency. This means that the described actuator is suitable for use in steering the rear wheels. If a ball screw is used for the conversion mechanism, a reverse efficiency will not be completely null, but a suitable gear ratio may be used for the epicyclic gearing so as to prevent any problem from occurring in the steering operation.

Figure 6:
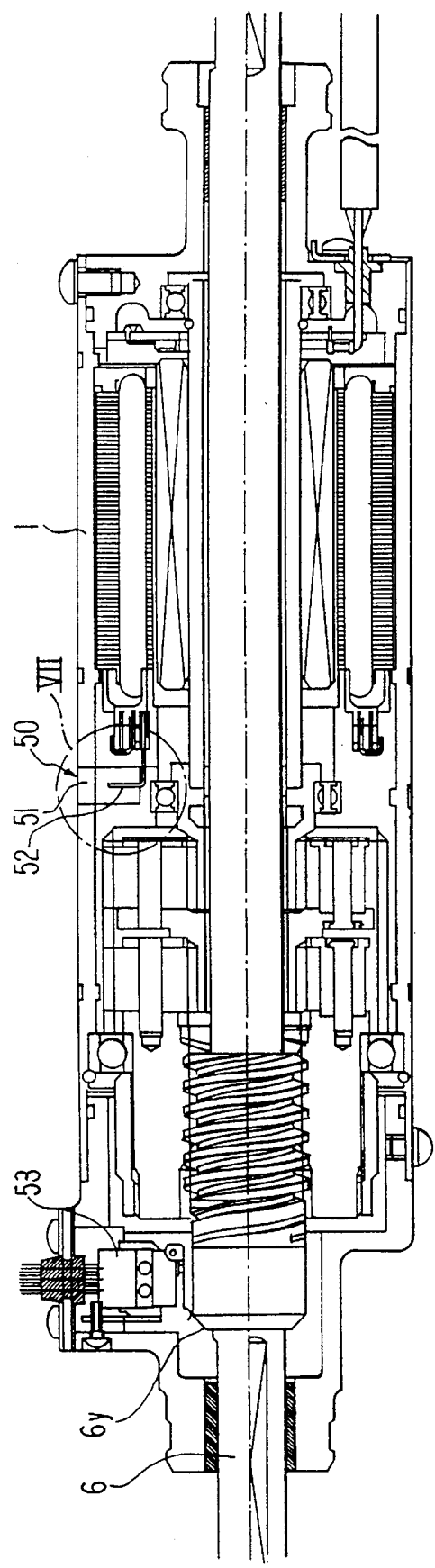
FIG. 6 is a longitudinal section of a modification.
Figure 7:
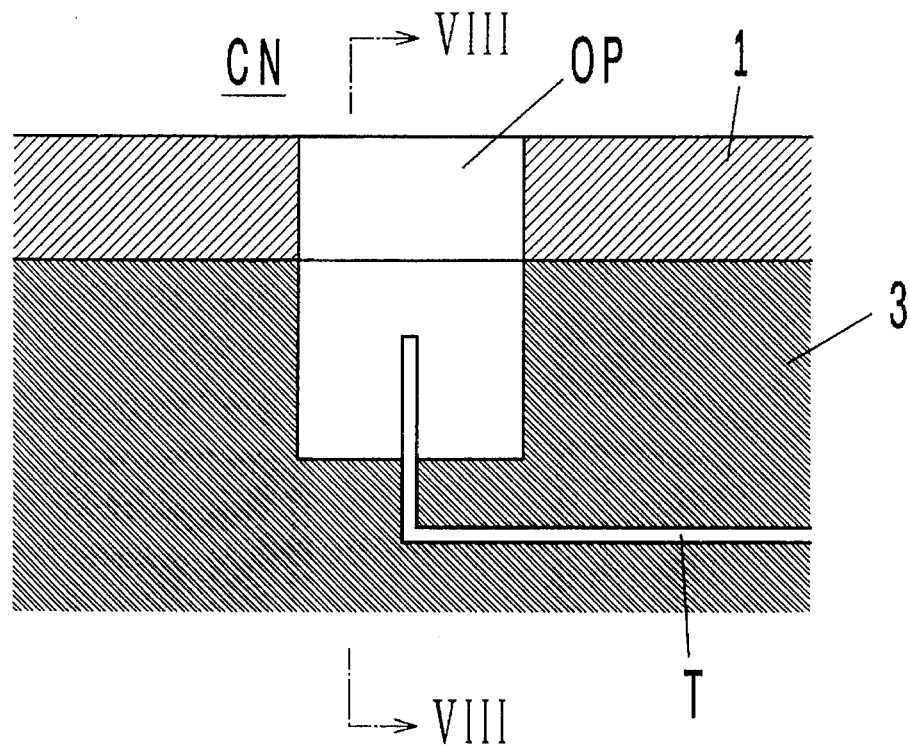
FIG. 7 is a cross section to an enlarged scale, illustrating a portion designated "VII" in FIG. 6.
Figure 8:
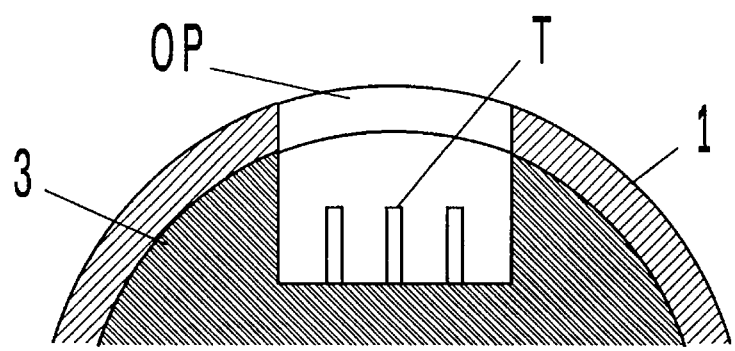
FIG. 8 is a transverse section taken along the line VIII—VIII shown in FIG. 7.

A modification of the actuator is shown in FIG. 6, and a region designated "VII" in FIG. 6 and corresponding to a connector portion is illustrated to an enlarged scale in FIG. 7. A cross section taken along the line VIII—VIII shown in FIG. 7 is shown in FIG. 8. In this modification, the construction of a connector 50 is simplified as compared with the embodiment shown in FIG. 1, and the potentiometer which detects the position is replaced by a limit switch 53.

Specifically, a shaft 6 is provided with a step 6y, and as the drive position of the actuator crosses a neutral position, the limit switch 53 is switched, thus providing an indication of the neutral position. In the region of a connector 50, L-shaped terminals 52 are exposed in an opening 51 formed in the casing 1, allowing an attachment plug, not shown, to be inserted and fitted thereon from the outside for connection.

Figure 9:
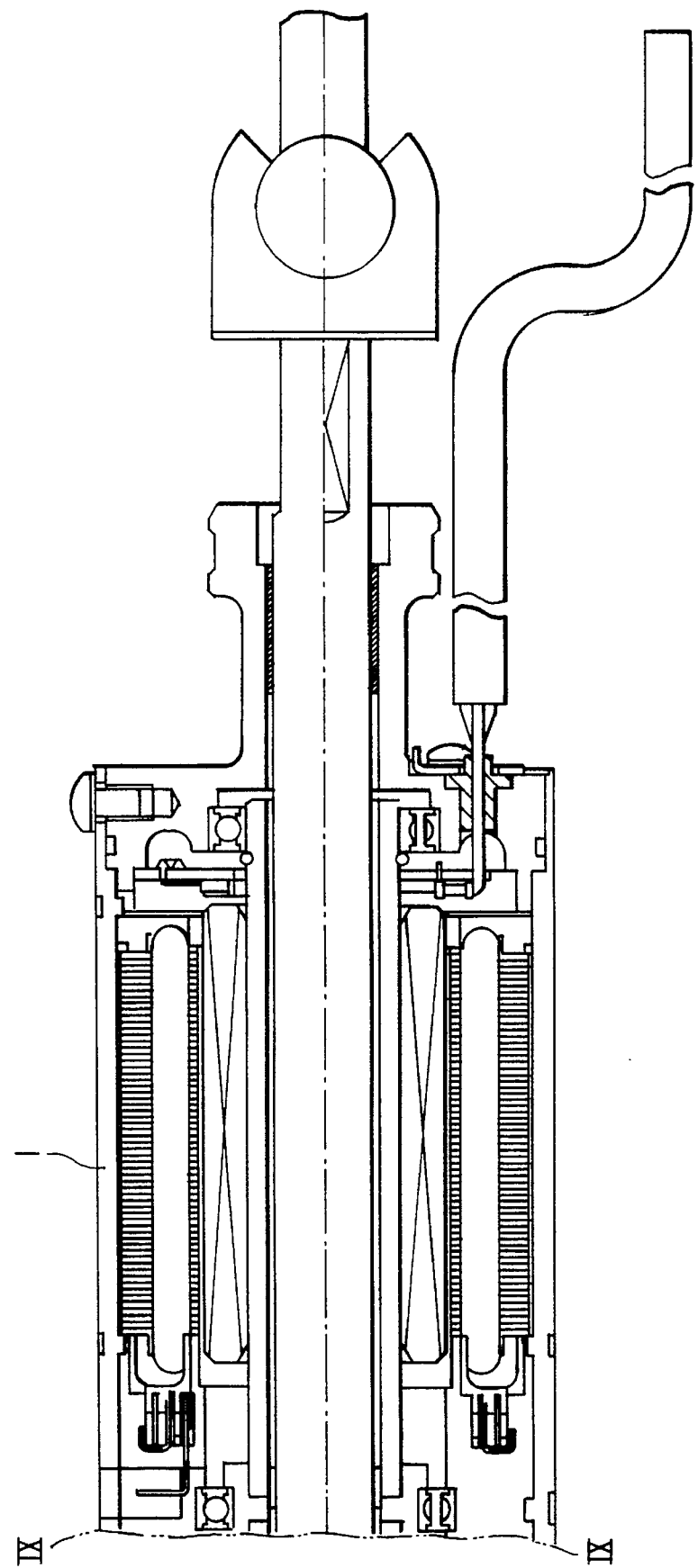
FIG. 9 is a longitudinal section of part of a further modification.

FIGS. 9 and 10 show another modification which utilizes a ball screw 54 for the conversion mechanism. FIGS. 9 and 10 respectively show a right half and a left half of the modification. By connecting FIGS. 9 and 10 at the phantom line IX—IX in FIGS. 9 and 10, the entire casing wall would be shown as a unitary assembly.

As described, in accordance with the invention, a drive source (2, 4, 5), a reduction gearing (7), a conversion mechanism (8) and an output shaft (6) can all be mounted on a common shaft, dispensing with a need to provide any separate member which provides a connection between respective mechanisms and also allowing certain parts to be shared by adjacent mechanisms. In this manner, the construction is simplified, allowing a reduction in size. In particular, since the winding member which generates heat is disposed outside the rotor, the heat generated by the winding member is easily transferred to the exterior through its adjacent housing member for dissipation, thus suppressing a temperature rise and avoiding the need to provide an additional space for purpose of heat dissipation. This also allows a reduction in the size of the overall actuator. Because the rotor can be made to a small diameter, the magnitude of inertia is reduced, improving the response of the actuator.

In addition, according to the invention, when the support member (3) is molded, one of the bearings (10) which support the rotor member (4) is disposed inside the mold to be secured integrally with the support member, again dispensing with the provision of a special member which is designed to fix the bearing and avoiding the need for a boring or a similar machining operation, again simplifying the construction and facilitating the assembly.

Furthermore, in accordance with the invention, when the support member (3) is molded, the ring gear (12) of the epicyclic gearing (7) is formed around part of the inner peripheral wall of the support member in accordance with the configuration of the mold, dispensing with the need for a separate member which works as a ring gear and thus reducing the number of parts and facilitating the assembly.

Finally, in accordance with the invention, a portion of the housing member which abuts against the support member is formed with a recess (1a, 1b) or projection before the support member (3) is molded upon the housing member (1). This allows the molding operation to form a corresponding projection or recess to be formed in the support member to enable a positive engagement between the recess in (or projection on) the housing member and a mating projection on (or recess in) the support member. Since the housing member is cylindrical in accordance with the invention as is the outer peripheral surface of the support member which abuts against it, a rotating drive applied between the winding member and the rotor member may cause a slip in the rotational direction between the support member and the housing member, but the positive engagement between the recess and the projection formed in or on the support member and the housing member, respectively, prevents such slip from occurring.

What is claimed is:

1. An actuator for steering rear wheels comprising:

a hollow, cylindrical housing member having an inner wall housing member;

a cylindrical coil member disposed coaxially within an inner space of the housing member;

a molded support member of resin material disposed completely within the housing member and integrally molded to the inner wall of the housing member and the coil member for supporting the coil member in an integral manner with the housing member;

a cylindrical rotor member disposed in an internal space of the coil member in coaxial relationship with the housing member and rotatably supported by the molded support member through a bearing;

a permanent magnet member mounted on the rotor member;

a drive shaft member extending through a central space within the rotor member;

an epicyclic gearing disposed coaxially within the housing member and the support member and including a first sun gear connected to the rotor member;

a motion conversion mechanism disposed in an internal space of the housing member in coaxial relationship therewith and interposed between the epicyclic gearing and the drive shaft member for converting a rotary motion of the gearing into a linear motion in the axial direction of the drive shaft member; and magnetic pole detecting means disposed in an internal space of the housing member for detecting the position of a magnetic pole on the permanent magnet member.

2. An actuator according to claim 1, wherein said bearing which supports the rotor member is integrally molded and secured to the support member.

3. An actuator according to claim 1, wherein a ring gear of the epicyclic gearing is integrally formed on an inner peripheral wall of the molded support member.

4. An actuator according to claim 1, wherein a portion of the housing member which abuts against the support member is formed with a recess or a projection, whereby a form-mating engagement is provided between the housing member and the support member to prevent rotational slippage therebetween.

5. An actuator according to claim 1 in which the motion conversion mechanism comprises a trapezoidal screw which is helically formed around the periphery of the drive shaft member and a nut operatively connected to the epicyclic gearing which threadably engages the trapezoidal screw.

6. An actuator according to claim 1 in which the motion conversion mechanism includes a ball screw mechanism comprising a groove which is helically formed in the outer periphery of the drive shaft member, a nut operatively connected to the epicyclic gearing and disposed outside the drive shaft member and having a groove which is helically formed therein, and a ball disposed between the groove in the drive shaft member and the groove in the nut.

7. An actuator according to claim 1, wherein said magnetic pole detecting means is also disposed in an internal space of said support member.

8. A method of manufacturing an actuator for steering rear wheels including a hollow, cylindrical housing member having an inner wall housing member, a cylindrical coil member disposed in an internal space of the housing member in coaxial relationship therewith, a support member of resin disposed completely within the housing member for supporting the coil member in an integral manner with the housing member, a cylindrical rotor member disposed in an internal space of the coil member in coaxial relationship with the housing member and rotatably supported by the support member through a bearing, a permanent magnet member mounted on the rotor member, a drive shaft member extending through a central space within the rotor member, an epicyclic gearing disposed in an internal space of the housing member in coaxial relationship therewith and including a first sun gear which is connected to the rotor member, a motion conversion mechanism disposed in an internal space of the housing member in coaxial relationship therewith and interposed between the epicyclic gearing and the drive shaft member for converting a rotary motion of the former into a linear motion in the axial direction of the latter, and magnetic pole detecting means disposed in an internal space of the housing member for detecting the position of a magnetic pole on the permanent magnet member;

the method comprising disposing said coil member and said bearing which supports the rotor member inside a mold within said housing member and molding said support member integrally with said housing member, said coil member and said bearing member.

9. A method as set forth in claim 8 further comprising the step of molding a ring gear of the epicyclic gearing as part of an inner peripheral wall of the support member in accordance with the configuration of the mold when the support member is molded.

10. A method as set forth in claim 8 further comprising forming projections or recesses inwardly of said housing member prior to molding said support member, said support member and said housing member will have a form-mating engagement therebetween to prevent rotational slippage therebetween.

* * * * *